United States Patent
Lanzarotta et al.

(10) Patent No.: US 7,029,544 B2
(45) Date of Patent: Apr. 18, 2006

(54) CONDUCTIVE PATHWAYS IN TIRE TREADS FOR REDUCED STATIC CHARGE BUILDUP

(75) Inventors: Joseph M. Lanzarotta, Uniontown, OH (US); William J. O'Briskie, Uniontown, OH (US); John F. Pawlikowski, Ravenna, OH (US)

(73) Assignee: Bridgestone Firestone North American Tire, LLC, Nashville, TN (US)

( * ) Notice: Subject to any disclaimer, the term of this patent is extended or adjusted under 35 U.S.C. 154(b) by 44 days.

(21) Appl. No.: 10/306,656

(22) Filed: Nov. 27, 2002

(65) Prior Publication Data

US 2003/0089436 A1    May 15, 2003

Related U.S. Application Data

(63) Continuation of application No. 09/663,176, filed on Sep. 15, 2000, now abandoned.

(51) Int. Cl.
| | |
|---|---|
| *B29D 30/00* | (2006.01) |
| *B29C 30/52* | (2006.01) |
| *B60C 1/00* | (2006.01) |
| *B60C 11/00* | (2006.01) |
| *B60C 19/08* | (2006.01) |

(52) U.S. Cl. ............... 156/110.1; 152/152.1; 152/209.5; 152/DIG. 2; 156/128.1

(58) Field of Classification Search ............ 152/152.1, 152/209.5, DIG. 2; 156/123, 128.1, 128.6, 156/110.1

See application file for complete search history.

(56) References Cited

U.S. PATENT DOCUMENTS

| | | | |
|---|---|---|---|
| 2,207,101 A | * | 7/1940 | Maynard ............ 152/209.5 |
| 2,650,641 A | | 9/1953 | Hiatt |
| 3,136,673 A | | 6/1964 | Carver |
| 4,152,186 A | | 5/1979 | Shibata |
| 4,678,694 A | * | 7/1987 | Claessen ............... 428/95 |
| 5,017,118 A | | 5/1991 | Looman et al. |
| 5,173,135 A | | 12/1992 | Tokieda et al. |
| 5,518,055 A | | 5/1996 | Teeple et al. |
| 5,587,417 A | | 12/1996 | Nakane et al. |
| 5,714,533 A | | 2/1998 | Hatakeyama et al. |
| 5,872,171 A | | 2/1999 | Detrano |
| 5,942,069 A | | 8/1999 | Gerresheim et al. |
| 6,289,958 B1 | * | 9/2001 | Dheur et al. ........... 152/152.1 |
| 6,290,810 B1 | | 9/2001 | Yovichin et al. |
| 2003/0084982 A1 | * | 5/2003 | Campbell ............ 156/110.1 |

FOREIGN PATENT DOCUMENTS

| | | |
|---|---|---|
| EP | 0 705 722 | 4/1996 |
| EP | 0 718 126 | 6/1996 |
| EP | 0 787 604 | 8/1997 |
| EP | 0 819 555 | 1/1998 |
| EP | 0 881 060 | 12/1998 |
| EP | 0 890 460 | 1/1999 |
| EP | 0 895 877 | 2/1999 |
| GB | 544 757 | 4/1942 |
| JP | 11-34605 | * 2/1999 |
| JP | 11-48710 | * 2/1999 |
| JP | 2000-85316 | 3/2000 |

* cited by examiner

*Primary Examiner*—Steven D. Maki
(74) *Attorney, Agent, or Firm*—Meredith E. Palmer

(57) ABSTRACT

A pneumatic tire having improved conductivity is disclosed herein whereby the tire is provided with at least one conductive pathway extending through the tread surface and contacting the tread cushion. Conductive pathways are created by introducing small volumes of high carbon black concentration. Such pathways provide low electrical resistance and dissipation of static charge accumulation on a motor vehicle.

10 Claims, 1 Drawing Sheet

CONDUCTIVE PATHWAYS IN TIRE TREADS FOR REDUCED STATIC CHARGE BUILDUP

This application is a continuation application of U.S. patent application Ser. No. 09/663,176 filed Sep. 15, 2000, now abandoned.

BACKGROUND OF THE INVENTION

There are diverse requirements for tire tread for pneumatic radial tires since it is desirable that modern tires have low rolling resistance, which leads to reduced fuel consumption, good running stability having a large frictional resistance on a wet road and the ability to manufacture such treads at reasonable costs. It is also desirable to minimize the electrostatic charge in the tires, which is produced by friction between a road surface and tire treads.

Typically tire tread compositions contain a substantial amount of carbon black which acts both as a filler and also gives adequate electrical conductivity to the tire, thereby suppressing static charge accumulation on the tire and the vehicle. However, to improve the balance between rolling resistance versus wet traction, tread compositions are made with lower carbon black loadings. Such compositions may cause the tire to have a higher electrical resistance which may interfere with charge dissipation and result in static charge accumulation. It is also known that a rubber composition for a tire into which a white filler, particularly silicon dioxide or aluminum hydroxide, is blended causes a wet skid performance to be highly compatible with reduced rolling resistance. Such white fillers, however, are non-conductive resulting in pneumatic tires which have much higher electrical resistance as compared to tires comprising rubber compositions containing mainly carbon black as the filler.

To reduce the electrostatic charge buildup in the tire, a number of solutions have been proposed. One technique is to employ conductive carbon black. Although this approach is effective in improving the conductivity and, therefore, dissipating the electrostatic charge, it deteriorates the rolling resistance of the tire and, therefore, reduces the effectiveness of a white filler. This approach is also costly. Another approach is to incorporate into the tread composition anti-static agents such as surfactants. An anti-static effect for plastics is displayed by causing an anti-static agent to bloom on the surface of plastics to form a hydrophilic, and therefore, conductive film. However, since tire treads, always rub a road surface and are abraided therewith, the film cannot be expected to grow, thus these anti-static agents are not really effective when applied to tire rubber.

U.S. Pat. No. 5,518,055 discloses a radial pneumatic tire having a silica-rich tread compound and at least one electrostatic discharge ring located on at least one shoulder portion of the tire. The electrostatic discharge ring provides a conductive path from the ground surface to a combination of a conductive belt edge rubber portion and a conductive sidewall rubber portion when the tire is in service. Such an approach requires a complex and costly manufacturing method and can be ineffective should the discharge ring wear faster than the surrounding tread rubber.

In U.S. Pat. No. 5,942,069, there is described a pneumatic vehicle tire comprising a tread strip which forms the tire tread and is made from an electrically insulating or poorly conducting material and a layer which is a good electrical conductor beneath the strip. In order to bring about adequate dissipation of electrical charge, the electrically conductive layer extends radially at least regionally up to and into the tire running-surface. Such a method requires a complex and costly manufacturing method and can be ineffective should the conductive layer in the running surface wear faster than the surrounding tread.

EP 0705722 teaches a pneumatic rubber tire wherein there is provided a water-based rubber composition of a blend of rubber latex and a water dispersion of electrically conductive carbon black which is applied to the outer surface of a cap of an unvulcanized silica reinforced rubber tire tread. The use of a water dispersion of electrically conductive carbon black adds material cost and is prone to wear, and can crack or flake off during the life of the tire.

A pneumatic tire having improved static discharge characteristics is disclosed in European Patent 0 718 126. The tire tread is provided with a thin conductive film which extends continuously in the circumferential direction of the tire. The film comprises a rubber composition containing at least 10 parts by weight of carbon black per 100 parts by weight of a rubber. Such an approach adds materials cost and is prone to wear.

The object of this invention is to enable the use of rubber compositions containing lesser amounts of carbon black, yet at the same time also reducing electrical resistance in the tire in order to suppress static charge accumulation on the tire and vehicle.

Another object is to provide a conductive path to the ground to dissipate possible static charge on the vehicle regardless of the source of the charge. That is, whether the charge is generated by the tire or other unspecified means.

Still a further object of the present invention is to enable the use of increased amounts of white fillers, especially silicon dioxide, to improve wet skid performance, and, at the same time, to improve the electrostatic charge dissipation.

The present invention utilizes an inexpensive, effective, and reliable technique to provide a conductive pathway through the tread to reduce tire electrical resistance and suppress static charge accumulation. The prior art relies on using techniques such as: a) adding a strip of conductive compound or cement to the tire tread, b) attempting complicated and costly tread designs combining conductive and less conductive compounds, c) using a conductive coating on the tread and/or sidewall areas, and d) adding conductive fillers such as extra conductive carbon black or anti-static agents to the tread (and possibly several other compounds).

A major advantage of the present invention is that the use of locally high carbon black concentrations achieve a desirably low Tire Electrical Resistance while maintaining the balance of other properties such as Rolling Resistance, Wet Traction, Wear Resistance, Adhesion, etc.

Another major advantage is low cost. In contrast, materials using prior art techniques are costly.

Another major advantage is that this technique assures suppression of static charge accumulation over the life of the tire. In contrast, some of the prior art may not be effective over the entire life of the tire. For instance, resistivity strips will not be effective if the strip material has a faster wear rate than the tread compound. Conductive coatings are prone to wearing or cracking off.

Another major advantage of this technique is simplicity. It requires no special materials, the principal is clear, and the result is effective.

SUMMARY OF THE INVENTION

In accordance with the present invention there is provided a tire tread having reduced tire electrical resistance by providing conductive pathways through non-conductive tread components to conductive internal components. Conductive pathways are created by introducing small volumes of high carbon black concentration that extend from the tread surface completely through the tread compound(s). The high carbon black concentration is achieved by any manner of piercing or slitting through the tread and depositing proper amounts of carbon black into the pierced, uncured tire tread thickness, as will be further described hereinafter. This results in good conductivity where the carbon black is deposited. After curing, the carbon black network is locked in place, forming a conductive pathway through the tread to conductive internal components to provide low electrical resistance from tire rim to ground and dissipation of the static charge accumulation on the motor vehicle. Numerous pathways are needed around the circumference of the tread to ensure several are always in ground contact as the tire is rolling.

BRIEF DESCRIPTION OF THE DRAWINGS

Further features of the present invention will become apparent to those skilled in the art to which the present invention relates from reading the following specification with reference to the accompanying drawings.

DETAILED DESCRIPTION OF THE INVENTION

Figure 1:
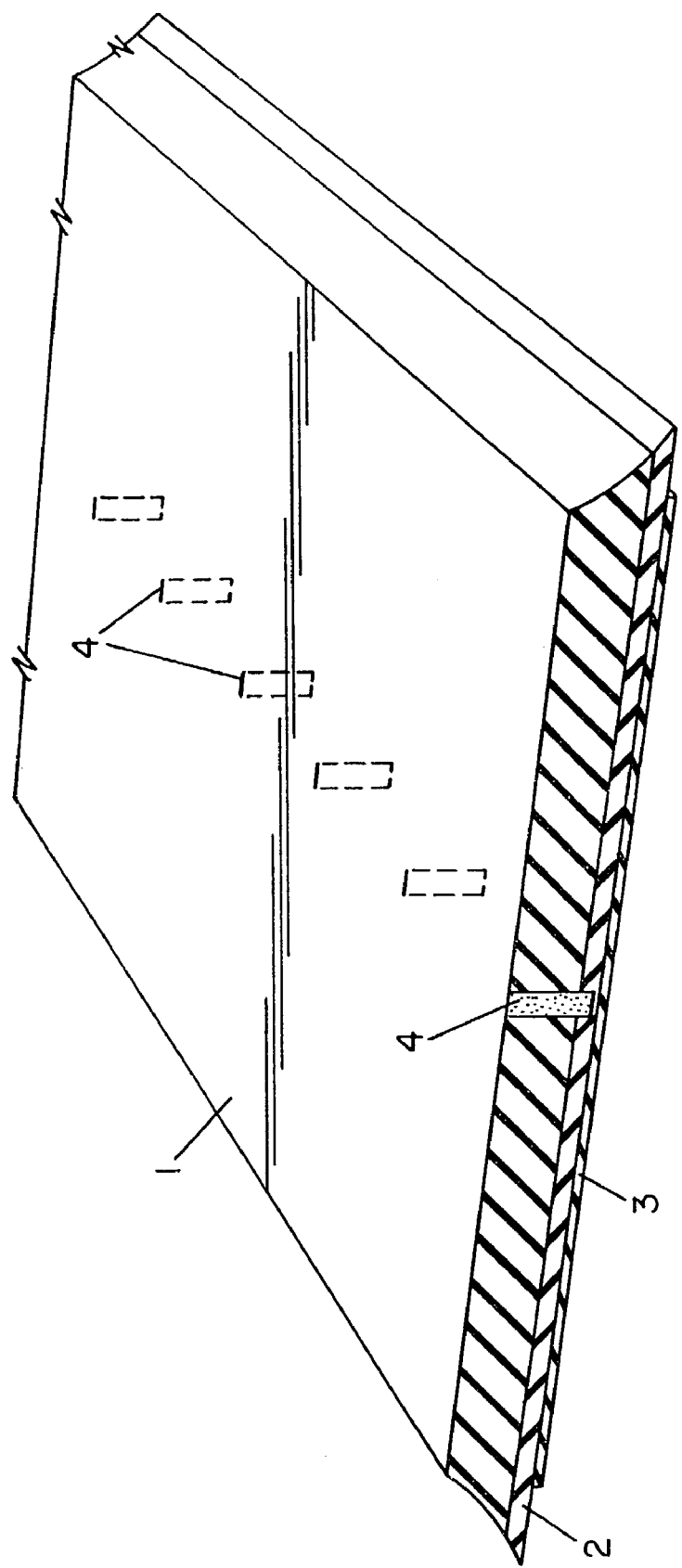
FIG. 1 is a cross-sectional view of a tire tread illustrating the conductive pathways of carbon black extending from the tread surface through the tire tread.

The present invention is directed to a pneumatic tire having improved conductivity comprising two opposite sidewall portions and a tread wherein the tread portion contains a multitude of distinct and substantially continuous carbon black conductive pathways extending through the tread surface to the conductive tread cushion. The invention is also directed to a method of decreasing an electrical static charge of a tire, the method comprising incorporating into the tire tread a multitude of distinct and substantially continuous carbon black conductive pathways extending through the tread surface and contacting the conductive internal components. Additionally, the invention is directed to a method of dissipating static electrical charge accumulation from a motor vehicle by providing a motor vehicle having at least one tire, wherein a tread of the tire is in ground contact with a road surface, and incorporating into the tread of the tire at least one distinct conductive pathway extending through the tread surface and contacting the tread cushion such that said static electrical charge is conducted from the motor vehicle, through the tread cushion, and to the road surface in order to dissipate the static electrical charge accumulation of the vehicle.

The tire tread formulations can contain conventional or typical amounts of conventional or typical rubbers and such formulations are generally known to the art. While the type and amounts of rubbers and additives can vary from component to component, they all generally comprise various rubbers such as natural rubber, synthetic isoprene, styrene-butadiene, polybutadiene, halobutyl rubber and the like; copolymers of from about 10 to about 70 percent by weight of styrene and from about 90 to about 30 percent by weight of butadiene such a copolymer of 19 parts styrene and 81 parts butadiene, a copolymer of 30 parts styrene and 70 parts butadiene, a copolymer of 43 parts styrene and 50 parts butadiene; polymers and copolymers of conjugated dienes such as polybutadiene, polyisoprene, polychloroprene, and the like, and copolymers of such conjugated dienes with an ethylenic group containing monomer copolymerizable therewith such as styrene, methyl styrene, chlorostyrene, acrylonitrile, 2-vinyl pyridine, 5-methyl-2-vinyl pyridine, 5-ethyl-2-vinyl pyridene, 2-methyl-5-vinyl pyridine, alkyl-substituted acrylates, vinyl ketone, methyl isopropenyl ketone, methyl vinyl ether, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1; particularly preferred are the ethylene-propylene copolymers wherein the ethylene content ranges from 20 to 90 percent by weight and also the ethylene-propylene polymers which additionally contain a third monomer such as dicyclopentadiene, 1,4-hexadiene and methylene norbornene.

The rubber compositions that may be used for the tread portion of the tire will normally contain carbon black and other conventional rubber additives such as fillers, plasticizers, antioxidants, curing agents and the like which are incorporated into the composition using standard rubber mixing equipment and procedures. For example, tire treads can be produced by kneading the terminally functionalized polymers and oxidized carbon blacks of the Invention with various compounding chemicals commonly used in the rubber industry, such as sulfur, stearic acid, zinc oxide, various vulcanization accelerators such as thiazoles, thiurams, and sulfur-amides, non-oxidized carbon black, reinforcing agents such as silica and calcium carbonate, and process oils, by means of a mixer such as a Banbury mixer, and by molding the rubber compound and vulcanizing it.

Another class of additives that are useful in tire tread compositions are white fillers, particularly silicon dioxide or aluminum hydroxide. White fillers cause a wet skid performance to be highly compatible with a low rolling resistance. Because of the non-conductivity of white fillers used for rubber, pneumatic tires using the white fillers have much higher electrical resistance as compared with tires comprising rubber compositions containing mainly carbon black as the filler. Currently, this problem is addressed by utilizing extra conductive carbon black in the rubber formulation. However, the use of extra conductive carbon black creates additional expense.

Typically, a normal tread compound will contain from about 0 to about 100 parts silica and from about 15 to about 100 parts of conventional carbon black, based upon 100 parts of rubber, with from about 20 to about 80 parts of silica per 100 parts of rubber being desirable, and from about 25 to about 50 parts of silica per 100 parts of rubber being preferred.

With the present invention, however, it is possible to employ white fillers in the tread and at the same time avoid the undesirable result of high electrical resistance and the cost associated with the addition of extra conductive carbon black because the carbon black conductive pathways of the present invention will cause the electrical charge to dissipate by conduction. This feature will also enable the use of rubber compositions with relatively low carbon black content.

Various types of carbon black can be utilized in the present invention including, but not limited to, any conventional "tread grade" carbon black such as N-115, N-234 and N-343 manufactured by Degussa, or carcass grade such as N-660, and the like. Such conventional carbon blacks will typically have a BET surface area of less than about 490, or typically about 200 or less square meters per gram ($m^2/g$) and a DBP absorption value of generally about 240 ml/100g or less, and typically 200 ml/100 g or less. The iodine number of convectional carbon black is typically about 200 or less. Although conventional carbon black is preferred, optionally, extra conductive carbon black may be utilized. Extra conductive carbon black is defined as having a DBP absorption value of at least 250 ml/100 g and a BET surface area oft least 500 m²/g. Suitable extra conductive carbon black include Printex XE2 manufactured by Degussa. Ketjenblack EC600 manufactured by AKZO, Enxaco 23 MM distributed by Vanderbilt and the like.

Quantitatively, the amount of carbon black to be utilized in each conductive pathway will be between about 10% and about 80% by weight of the resulting volume of the conductive pathway, with from about 30% to about 70% being desireable, and from about 40% to about 60% preferred.

Referring, then to the Figures, FIG. 1 depicts a tire tread having a tread surface 1, a subtread 2, and a cushion layer 3. Extending from the tread surface to the under tread cushion are one or more pathways of conductive carbon black which are thin but distinct carbon black concentrations through the tire tread. These pathways of carbon black will generally have a thickness within the range of from about 2 microns to about 400 microns, with the preferred thickness being from about 8 microns to about 60 microns.

The pathways of carbon black are distinctly different from the carbon black normally incorporated as a filler in the rubber composition. Normally, carbon black is used as a filler and is blended into the rubber composition together with other additives. The carbon black particles would be distributed evenly throughout the entire rubber composition and generally is not in close enough proximity to one another tube conductive. The high concentration of carbon black according to the present invention is not distributed throughout the rubber composition but, in fact, is concentrated in thin pathways such that the carbon black particles are in close enough proximity to be conductive. The carbon black particles are not diffused throughout the composition but are concentrated closely together such that the particles form a continuous conductive network which allows for the transfer of a charge between the particles. Even though it is a substantially continuous pathway of carbon black particles, it should be remembered that such particles are not dense and compact but rather porous. For this reason, molecules of rubber polymers will normally penetrate the porous voids of the carbon black particles, as well as penetrate between carbon black particles. Nevertheless, as noted above, the carbon black particles will still remain in close proximity with each other and therefore provide good electrical conduction.

The concentration of the conductive carbon black particles creating the conductive pathways and the proximity of such particles to each other should be such as to form a conductive pathway which permits the dissipation of static charge from the tire. This concentration, then, can be easily determined by one skilled in the art. The exact concentration of conductive carbon black particles will depend on various factors, such as the exact composition of the rubber, the amount of carbon black filler present, the amount of white fillers, and other chemical and physical features of a tire. Thus, one skilled in the art can determine by testing the concentration of the carbon black particles in the conductive pathway, i.e., the proximity of the particles to each other, necessary to obtain the desired reduction in tire resistance, and the number of such conductive pathways required to provide such reduction.

It is not critical how many such carbon black conductive pathways are present in a tire tread, nor is it critical that the pathways be in an uninterrupted pathway around the tire tread. The number of pathways will clearly depend on the size of the tire and he specific use of the tire. Normally, at least one such carbon black pathway in any given "footprint" area will be required to enable full dissipation of the electrical charge from the tire. Clearly, the larger the tire the more pathways of carbon black will be required. Furthermore, the placement of the carbon black pathways need not be in any particular pattern on the tire tread, but can be randomly scattered on the tread surface. It is, however, necessary that the carbon black conductive pathways extend throughout the tread surface and be in contact with the subtread and tread cushion to provide a channel so that the electrical charge can be grounded.

The high carbon black concentration can be achieved by any manner, such as by piercing, slitting, or injecting through the tread and depositing the desired amount of carbon black particles in the pierced or slit surface. Such methods can include piercing/brushing, piercing/coated thread, piercing/injecting, piercing/deposition of conductive rubber thread, slitting/brushing or smearing. For economy and ease of manufacture, however, the preferred method is piercing/brushing. In this method, a small metal file or other instrument with a textured surface may be coated with the carbon black particles themselves, or with a suspension of carbon black in water or oil. The coated instrument is then punched through the tire tread such that it penetrates through the tread, leaving a deposit of carbon black through the pierce and on the surface of the tread in proximity to the pierce itself. However, it is not critical which specific method is used for depositing or creating the carbon black pathways.

After curing, the carbon black network is locked in place, forming a conductive pathway through the tread to conductive internal components. Normally, numerous pathways are needed around the circumference of the tread to insure that several bands of carbon are always in ground contact as the tire is rolling. However, there should be at least one pathway in any randomly selected tire footprint from around the tire.

While the above discussion has been directed to conventional or extra conductive carbon black as the preferred material for creation of the conductive pathways, it is also contemplated that any conductive material which does not adversely effect other tire tread requirements may be utilized to form the conductive pathways. Such materials include, but are not limited to, aluminum, silver, gold, platinum, zinc, tin, brass, nickel, graphite, carbon fibrils, anti-statics such as fatty acid esters, ethoxylated alkylamines and alkylsulfonates, and liquid materials such as Vulkanol 85, an etherthioether, manufactured by Bayer Chemical.

The present invention will be better understood by reference to the following examples, which serve to illustrate but not to limit the invention.

EXAMPLE 1

The various components of Table 1 were blended in a conventional manner known to the art. Prior to curing, at least one conductive carbon pathway is introduced into the test tire tread and the tread is then cured.

The tire electrical resistance of a passenger pneumatic tire was conducted in accordance with the following procedure. A standard passenger tire was soaked in the test environment of 70° F.±3° F. and a relative humidity of less than 60% maximum for a minimum period of 8 hours prior to testing. The tire surface was then cleaned with a high purity isopropyl alcohol or similar agent and then dried.

The tire was mounted DOT on a special static charge measurement wheels and inflated to 30 psi (207 KPA). Test locations were then marked on the opposite serial side of the tire per the following sequencing:

At every 8 locations (every 45° clockwise) and labeled A through H.

The tire was mounted on the static charge measurement wheel with position "A" as the initial position. The tire was preloaded to a test load of 80% of dimensional load and then released. The loading was repeated and electrical resistance measurements recorded. Testing occurred at each marked location on the tires. Results of the tire electrical resistance testing are as indicated in Table I.

TABLE I

|  | Control Tire | Tires with Pathways |
| --- | --- | --- |
| Tread | 50% silica | 50% silica |
| Subtread | Low Carbon Black Loading | Low Carbon Black Loading |
| Black Side Wall | Low Carbon Black Loading | Low Carbon Black Loading |
| New Tire Electrical Resistance | E11–E12 ohms | E7–E8 ohms |
| New Tire Appearance | Normal | Pathways not detectable |
| Rolling Resistance | 26.3 Newtons | 26.5 Newtons |
| *CC1/80% Load | 0.211 | 0.209 |

*cornering coefficient at 1% slip; Tire load of 80%

The tires were then worn to 50% tread remaining. Electrical resistance testing was conducted on the worn tires. Results of testing are shown in Table II below:

TABLE II

|  | Control Tire | Tires with Pathways |
| --- | --- | --- |
| Tread | 50% silica | 50% silica |
| Subtread | Low Carbon Black Loading | Low Carbon Black Loading |
| Black Side Wall | Low Carbon Black Loading | Low Carbon Black Loading |
| Worn Tire Electrical Resistance | E13 ohms | E8 ohms |
| Worn Tire Appearance | Smooth | Pathways not detectable |

As apparent from the data in Tables I and II, tire electrical resistance in the tires containing the carbon black deposits was improved.

While in accordance with the patent statutes, the best mode and preferred embodiment have been set forth, the scope of the invention is not limited thereto, but rather by the scope of the attached claims.

What is claimed is:

1. A method of decreasing an electrical static charge of a tire comprising the steps:
    a) incorporating into a tread of a tire at least one pathway extending through the tread and contacting a conductive internal component of the tire; and
    b) depositing a sufficient amount of conductive material without rubber into said pathway to allow dissipation of static charge, wherein said conductive material consists of carbon black and optionally water or oil.

2. A method according to claim 1 wherein said pathway is introduced prior to curing of the tire.

3. A method according to claim 1 wherein said carbon black has a BET surface area of less than about 490 m$^2$/g, a DBP absorption of about 240 ml/100 g or less, and an iodine number of about 200 or less.

4. A method according to claim 1 wherein said pathway comprises carbon black having a BET surface area of at least about 500 m$^2$/g, a DBP absorption of about 250 ml/100 g, and an iodine number of about 500–1000.

5. A method according to claim 1 wherein said pathway comprises carbon black having a BET surface area of at least about 35 m$^2$/g, a DBP absorption of about 80 ml/100 g, and an iodine number of about 30.

6. A method according to claim 1, wherein the pathway is from 8 to 60 microns wide.

7. A method according to claim 1, wherein said at least one pathway comprises pathways which are randomly distributed on the tread surface.

8. A method according to claim 1, wherein said pathway is introduced into the tread by one or more of piercing, and slitting and wherein said conductive material is deposited into said pathway by one or more of brushing, smearing, and injecting.

9. A method according to claim 8, wherein said pathway is introduced into the tread by piercing, and said conductive material is deposited by brushing.

10. A method according to claim 1, wherein the pathway is incorporated into the tread by an instrument coated with the conductive material, whereby the conductive material is deposited into the pathway by brushing or smearing.

* * * * *